Patented Dec. 5, 1933

1,938,179

UNITED STATES PATENT OFFICE 1,938,179

TRIORGANO METAL COMPOUNDS

Herbert Peter Augustus Groll, Berkeley, Calif., assignor to Shell Development Company, San Francisco, Calif., a corporation of Delaware No Drawing. Application March 7, 1930
Serial No. 434,163

19 Claims. (Cl. 260—11)

My invention consists in the preparation of triorgano compounds of trivalent heavy metals, particularly of thallium. These compounds were unknown heretofore, and in several chemical publications it is even stated that they do not seem to exist at all, because all efforts to make them have been unsuccessful. Under the compounds of my invention I include the triorgano compounds of the heavy metals of the third group, thallium, indium and gallium, and of trivalent gold, or in other words, of all heavy metals the highest valency of which is three.

I have found that triorgano compounds of thallium and of other trivalent heavy metals do exist and can be prepared by the action of an organo alkali metal compound on a salt of a diorgano hydroxide of the heavy metal. Naturally only those salts can be used, the acid radical of which is not destroyed by the organo alkali metal compound; preferably I use a halide. Such reaction, constituting the process of my invention, can be written in a general formula as follows:

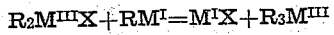

$$R_2M^{III}X + RM^I = M^IX + R_3M^{III}$$

Such salts of a diorgano hydroxide of a trivalent heavy metal are known, and a great number have been prepared before.

The organo alkali metal compounds used for the synthesis are also known. They are very reactive substances and are destroyed with spontaneous ignition by oxygen, water, carbon dioxide, and various other substances. Some of them even react with ether. Therefore, great care has to be taken to exclude any air or moisture from the apparatus during the operation. The synthesis has to be carried out in an atmosphere of pure nitrogen or another indifferent gas, and the apparatus as well as the reagents have to be carefully purified and dried. In cases where the organo alkali metal compound is decomposed by ether, an indifferent solvent or suspending agent as dry petroleum ether or benzene is used.

All these precautions are well known and various operating methods and apparatus may easily be provided by those skilled in the art. The reaction between the diorgano metal halide and the organo alkali metal compound takes place at comparatively low temperatures. Heating of the mixture above a certain maximum temperature is detrimental to the success of the synthesis. In some cases I even prefer to cool the mixture by suitable means considerably below atmospheric temperature in order to prevent side reactions such as formation of free metal.

The maximum allowable temperature is much below the decomposition temperature of either of the reaction components or of the finished product, for example, thallium diethyl chloride and lithium ethyl are each stable up to about 200° C., and thallium triethyl is stable up to about 130° C.; nevertheless, the reaction mixture consisting of thallium diethyl chloride and lithium ethyl under petroleum ether must not be heated above atmospheric temperature. Even heating to only 40° C. causes decomposition to gray spongy metallic thallium, vitiating the yield. Decomposition can easily be recognized and the most suitable temperature may be found from case to case by trial experiments.

Example No. 1

Thallium triethyl

Thirty-three grams of dry finely pulverized thallium diethyl chloride were put into a 200 cc. bulb. Enough dry petroleum ether of 30–50° C. boiling range was added to cover the compound and to expel any air from the powder. The air was displaced from the bulb by a stream of highly purified nitrogen and the bulb was inserted into a freezing mixture to prevent reaction during the addition of the lithium ethyl. Six grams of lithium ethyl were added to the thallium compound. In this case I prefer to use lithium ethyl, as it is sparingly soluble in petroleum ether and therefore easier to contact with the insoluble thallium diethyl chloride than a compound like sodium ethyl, which is insoluble in petroleum ether. One-hundred fifty cc. of petroleum ether were added and the bulb sealed. The bulb was then shaken rapidly with constant cooling until no further heat was evolved. The bulb was further shaken for forty-eight hours in a shaking machine until most of the thallium diethyl chloride, a heavy powder, had disappeared. The bulb was opened. (In case any lithium ethyl is left, it is decomposed by dry air). The clear yellow solution of thallium triethyl was filtered off the light lithium chloride powder which had been formed during the reaction. The petroleum ether was evaporated from the filtered solution. The residue is fairly pure thallium triethyl which may be further purified by distillation under vacuum.

Example No. 2

Thallium diethyl triphenyl-methyl

Twenty-four grams of pulverized dry thallium diethyl chloride was placed in a bulb and the powder covered with dry ether. The air was displaced by dry nitrogen and 1070 cc. of a 0.075 normal solution of sodium triphenyl methyl in ether were added and the bulb sealed. The mixture was shaken until the red color of the sodium triphenyl methyl had disappeared. The product was filtered and the ether evporated from the thallium diethyl triphenyl methyl formed.

I claim as my invention:

1. A compound consisting of a heavy metal of the third group of the periodic table and three hydrocarbon radical groups.

2. Trialkyl compounds of heavy metals of the third group of the periodic table.

3. A compound consisting of thallium and three hydrocarbon radical groups.

4. Trialkyl compounds of thallium.

5. Thallium triethyl.

6. A process for preparing compounds consisting of a trivalent heavy metal and three hydrocarbon radical groups comprising: reacting on a salt of an inorganic acid and trivalent metal containing two hydrocarbon radical groups with a compound containing a hydrocarbon radical group directly linked to an alkali-metal.

7. A process for preparing compounds of a trivalent heavy metal and three hydrocarbon radical groups comprising: reacting on a dialkyl salt of an inorganic acid and trivalent metal with a compound containing a hydrocarbon radical group directly linked to an alkali-metal.

8. A process for preparing a compound of a trivalent heavy metal and three hydrocarbon radical groups comprising: reacting on a halide of the trivalent metal containing two hydrocarbon radical groups with a compound containing a hydrocarbon radical group directly linked to an alkali-metal.

9. A process for preparing compounds of a trivalent heavy metal and three hydrocarbon radical groups comprising reacting on a dialkyl halide of the trivalent metal with a compound containing a hydrocarbon radical group directly linked to an alkali-metal.

10. A process for preparing compounds of thallium containing three hydrocarbon radical groups comprising reacting on a salt of an inorganic acid and thallium containing two hydrocarbon radical groups with a compound containing a hydrocarbon radical group directly linked to an alkali-metal.

11. A process for preparing compounds of thallium containing three hydrocarbon radical groups comprising: reacting on a dialkyl salt of an inorganic acid and thallium with a compound containing a hydrocarbon radical group directly linked to an alkali-metal.

12. A process for preparing compounds of thallium containing three hydrocarbon radical groups comprising: reacting on a dialkyl halide of thallium with a compound containing a hydrocarbon radical group directly linked to an alkali-metal.

13. A process for preparing compounds of thallium containing three hydrocarbon radical groups comprising: reacting on a diethyl salt of an inorganic acid and thallium with a compound containing a hydrocarbon radical group directly linked to an alkali-metal.

14. A process for preparing compounds of thallium containing three hydrocarbon radical groups comprising: reacting on a halide of thallium containing two hydrocarbon radical groups with a compound containing a hydrocarbon radical group directly linked to an alkali-metal.

15. In the preparation of thallium triethyl the step of: reacting on thallium diethyl chloride with lithium ethyl.

16. In the process for the introduction of an alkyl group into a metallo compound containing a polyvalent metallic element directly linked to an acid radical, the step of reacting the metallo compound with a compound containing an alkyl group directly linked to an alkali-metal.

17. In the process for the introduction of an alkyl group into a metallo compound containing at least two halogen atoms directly linked to a polyvalent metallo element, the step of reacting a metallo compound with a compound containing an alkyl group directly linked to an alkali-metal.

18. In the process for the introduction of an alkyl group into a metallo organic compound containing a metallic element directly linked to at least one hydrocarbon group and one acid radical, the step of reacting a metallo organic compound with a compound containing an alkyl group directly linked to an alkali-metal.

19. Thallium diethyl triphenyl methyl.

HERBERT PETER AUGUSTUS GROLL.